United States Patent
Odai et al.

Patent Number: 5,857,318
Date of Patent: Jan. 12, 1999

[54] TRANSMITTING CHAIN

[75] Inventors: Nobuhiro Odai, Sakado, Japan; Junichi Uchimaru, Chicopee, Mass.

[73] Assignee: Tsubakimoto Chain Co., Osaka-fu, Japan

[21] Appl. No.: 28,464

[22] Filed: Feb. 24, 1998

[30] Foreign Application Priority Data

Feb. 28, 1997 [JP] Japan ................................. 9-045928

[51] Int. Cl.⁶ ........................... B21L 9/02; F16G 13/06
[52] U.S. Cl. ............... 59/4; 59/5; 59/35.1; 29/898.1; 384/283; 384/291; 384/378; 474/206
[58] Field of Search ........................... 59/4, 5, 7, 8, 35.1, 59/901; 384/283, 284, 291, 378; 474/206

[56] References Cited

U.S. PATENT DOCUMENTS

| | | |
|---|---|---|
| 1,925,055 | 8/1933 | Mize . |
| 2,431,702 | 12/1947 | Mccann ......................... 59/8 |
| 5,459,993 | 10/1995 | Kuriyama et al. .............. 59/4 |
| 5,468,376 | 11/1995 | Bates ............................. 59/4 |
| 5,697,206 | 12/1997 | Otani et al. . |

FOREIGN PATENT DOCUMENTS

| | | |
|---|---|---|
| 261292 | 11/1926 | United Kingdom . |
| 552235 | 3/1943 | United Kingdom . |

OTHER PUBLICATIONS

Low–Noise Chain With Oil Groove; K. Tanaka et al; Application No. 08/800,579, filed on Feb. 18, 1997.

*Primary Examiner*—David B. Jones
*Attorney, Agent, or Firm*—Armstrong, Westerman, Hattori, McLeland, & Naughton

[57] ABSTRACT

A transmitting chain is provided which can lower surface pressure between a bushing and a pin, which can well maintain a lubricating state, and which is high in durability so as to be capable of withstanding high load. A groove or a depression, into which lubricating oil, supplied from outside of the chain, is moved, is formed in at least one of a group including an inner peripheral surface of a bushing and an outer peripheral surface of a pin. A difference, space, or clearance, located between an inside diameter of the bushing and an outside diameter of the pin, of portions of the chain not including the groove or depression, is set in a range of from about 0.05 to 0.6% of the outside diameter of the pin.

9 Claims, 9 Drawing Sheets

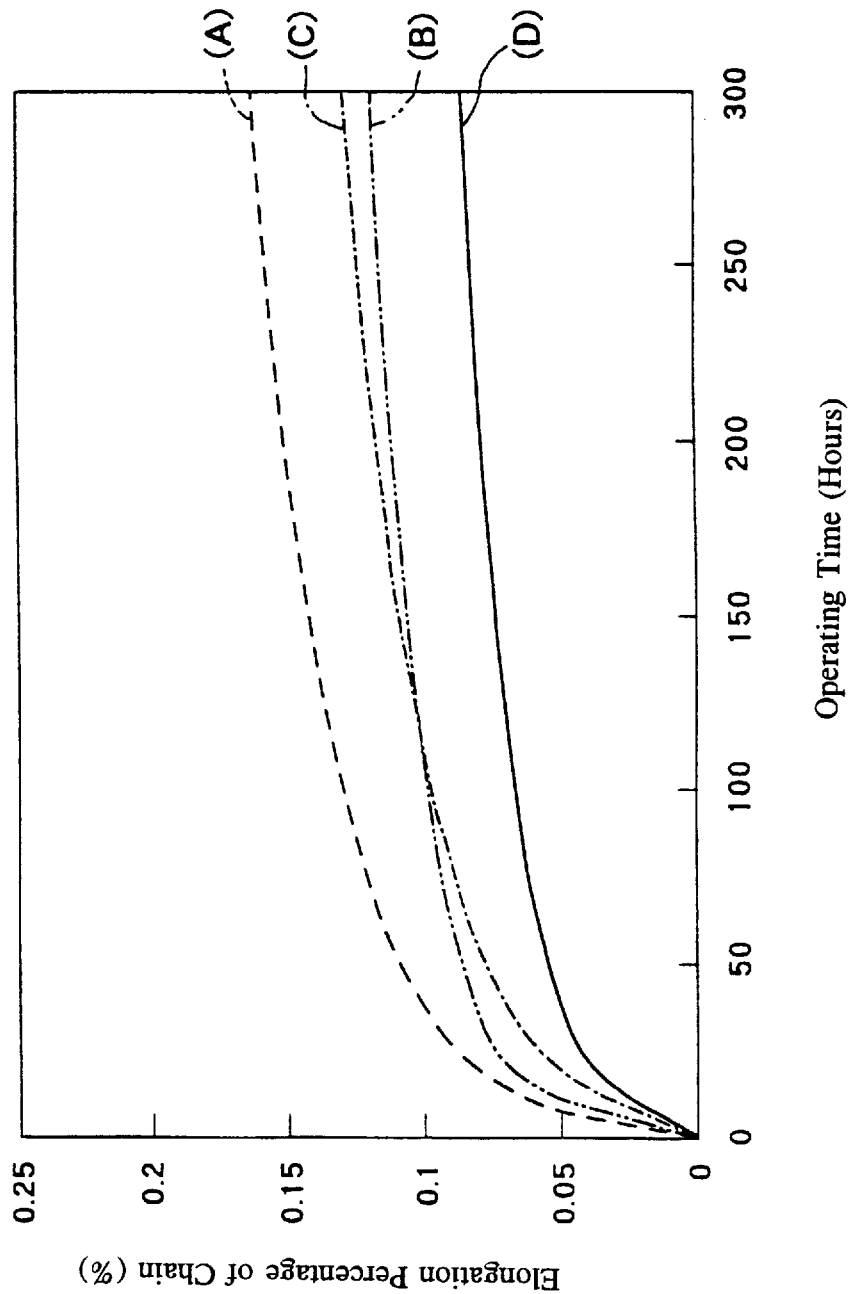

TRANSMITTING CHAIN

FIELD OF THE INVENTION

The present invention relates to a transmitting chain used by forced lubrication or oil bath lubrication of lubricating oil.

DESCRIPTION OF THE RELATED ART

In a conventional transmitting chain, such as a timing chain used to drive a cam of an automotive engine, engine oil fed under pressure from an oil pump of the engine is directly blown against the chain for forced lubrication. In this kind of conventional transmitting chain of this kind, lubricating oil blown against the chain passes through a clearance S between an inner surface of an outer plate A and an end of a bushing C, wherein both ends of the bushing are fitted in an inner plate B. The lubricating oil then permeates into a clearance between an inner peripheral surface of the bushing C and an outer peripheral surface of a pin D to form an oil film of lubricating oil L there between, as shown in FIG. 11.

Furthermore, in the above-described conventional transmitting chain, a difference, space, or clearance, between an inside diameter of a bushing and an outside diameter of a pin, is set to be about 1.5% of the outside diameter of the pin to facilitate arrival of lubricating oil at a contact surface between the pin and the bushing which is an abrasive part of the chain.

However, the above-described conventional transmitting chain has a problem in that when operated under high load or when using a lubricating oil with deteriorated lubricating performance, abrasion of a pin or a bushing materially progresses so that an abrasion elongation of the chain increases.

It has been found, as a result of a study done by the present inventor, that if a difference, space, or clearance, which is located between an inside diameter of a bushing and an outside diameter of a pin, is set too large, i.e., about 1.5% of the outside diameter, the surface pressure of the contact surface therebetween increases, the oil film of lubricating oil is cut, local abrasion is accelerated, and the abrasion is accelerated accordingly.

The present invention overcomes the above-described problems with respect to the prior art by providing a transmitting chain which can lower surface pressure between a bushing and a pin, which can maintain a good lubricating state, which is high in durability, and which can withstand a high load.

SUMMARY OF THE INVENTION

The present invention relates to a transmitting chain in which outer peripheries of both ends of a hollow cylindrical bushing are fitted in and secured to bushing holes of a pair of inner plates, and both ends of pins, which are rotatably inserted into the bushing are fitted in and secured to pin holes of outer plates arranged on both outer sides of the pair of inner plates.

According to a first embodiment of the present invention, a groove or a depression is provided into which lubricating oil is supplied from outside of the chain. The groove or depression is formed in at least one of a group consisting of an inner peripheral surface of the bushing and an outer peripheral surface of the pin. A difference, space, or clearance, located between an inside diameter of the bushing and an outside diameter of the pin, of portions of the chain not including the groove or depression, is set in a range of from about 0.05% to 0.6% of the outside diameter of the pin.

According to a second embodiment of the present invention, a notch or a hole is formed to allow flow of lubricating oil. The notch or hole extends between an outer peripheral surface and an inner peripheral surface of the bushing. A difference, space, or clearance, located between an inside diameter of the bushing and an outside diameter of the pin, is set in a range of from about 0.05 to 0.6% of the outside diameter of the pin.

According to a third embodiment of the present invention, a groove or a depression is provided into which lubricating oil is supplied from outside of the chain. The groove or depression is formed in at least one of a group consisting of an inner peripheral surface of the bushing and an outer peripheral surface of the pin. A notch or a hole is formed to allow flow of lubricating oil. The notch or hole extends between an outer peripheral surface and an inner peripheral surface of the bushing. A difference, space, or clearance, located between an inside diameter of the bushing and an outside diameter of the pin, of portions of the chain not including the groove or depression, is set in a range of from about 0.05 to 0.6% of the outside diameter of the pin.

When lubricating oil is supplied to the transmitting chain of the present invention from outside thereof by means of either direct blowing or oil bath, the lubricating oil moves into a difference, space, or clearance, located between the bushing and the pin, to form an oil film between the inner peripheral surface of the bushing and the outer peripheral surface of the pin. In this case, when a notch or a hole is formed to allow flow of lubricating oil and the notch or hole extends between the outer peripheral surface and the inner peripheral surface of the bushing, the lubricating oil can be more easily moved into the bushing.

Within the bushing, surplus lubricating oil is moved into and stored in a groove or a depression formed in either the inner peripheral surface of the bushing or the outer peripheral surface of the pin. Further, lubricating oil, supplied from outside the transmitting chain, is partly stored in the notch or hole.

In the transmitting chain according to the present invention, since a difference, space, or clearance, located between an inside diameter of the bushing and an outside diameter of the pin, of portions of the chain not including the groove or depression, is very small, i.e., about 0.05 to 0.6% of the outside diameter of the pin, surface pressure, exerted during operation of the transmitting chain, between the inside diameter of the bushing and the outside diameter of the pin, is low.

The oil film formed in the difference, space, or clearance, located between the bushing and the pin, is such that, since the lubricating oil stored in anyone of the groove or the depression and the notch or the hole gradually flows out into the difference, space, or clearance, located between the inner peripheral surface of the bushing and the outer peripheral surface of the pin, it is difficult to cut the oil-film, even during operation of the transmitting chain under high load. Furthermore, the abrasion of the bushing and pin is suppressed so that the abrasion elongation of the chain can be reduced.

BRIEF DESCRIPTION OF THE DRAWING FIGURES

Figure 3A:
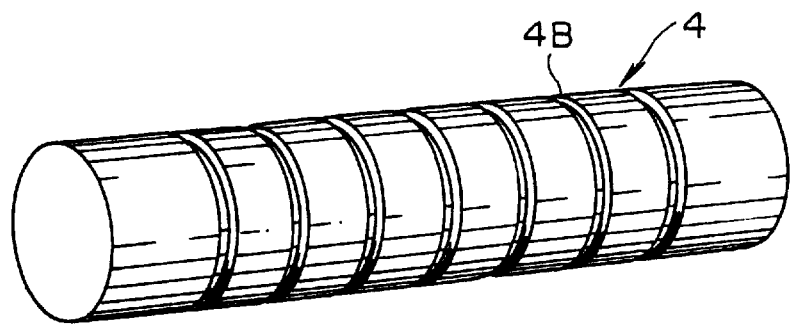
Figure 3B:
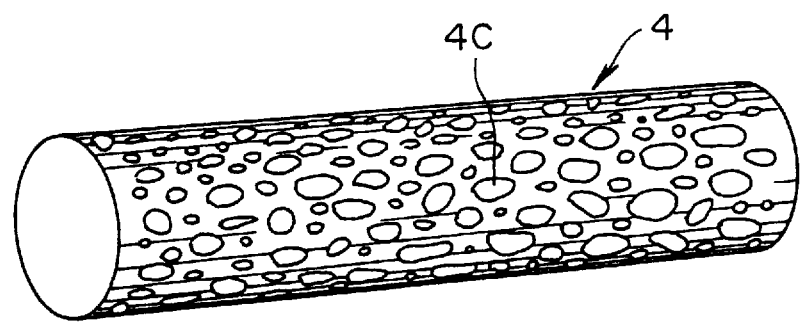

FIGS. 3(a) and 3(b) are perspective views of a pin according to a second embodiment of the transmitting chain of the present invention.

FIGS. 4(a), 4(b), 4(c), and 4(d) are perspective cross-sectional views of a bushing mounted on an inner plate according to a third embodiment of the transmitting chain of the present invention.

Figure 5A:
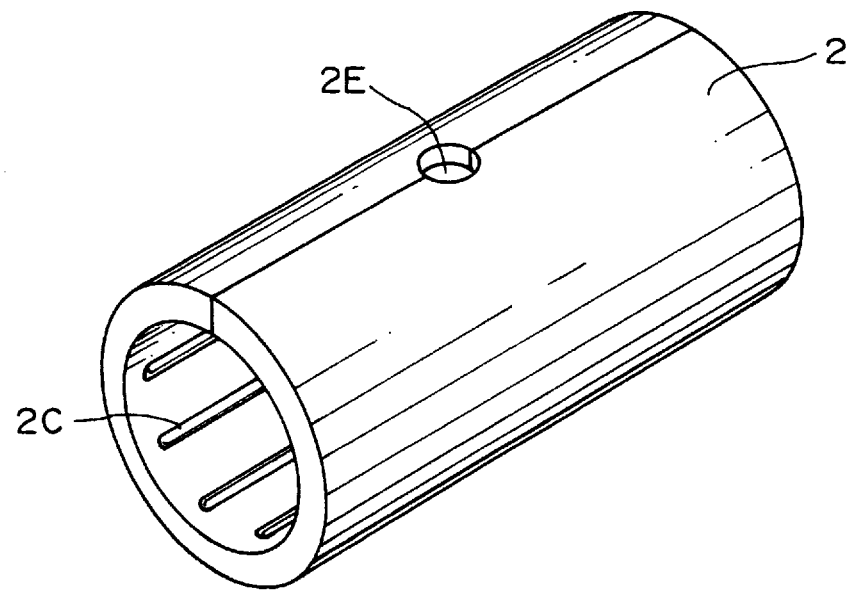
Figure 5B:
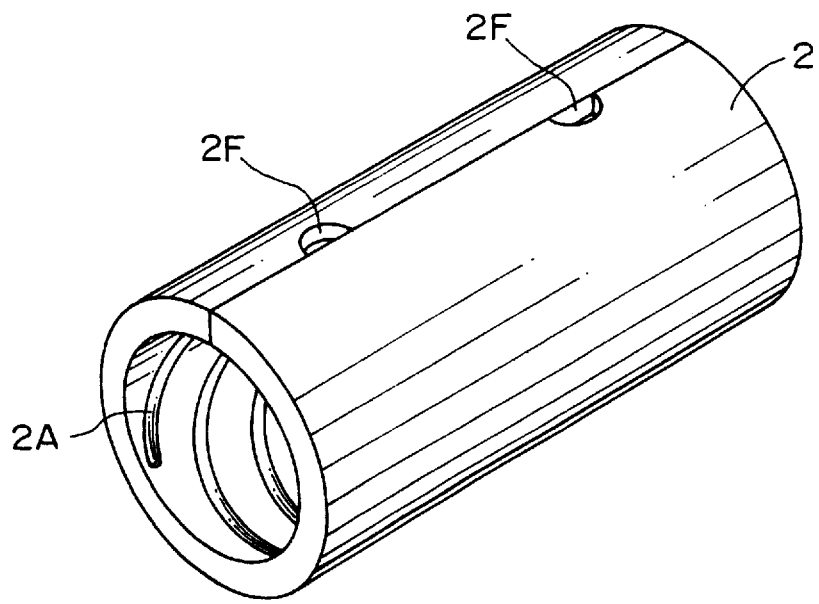

FIGS. 5(a) and 5(b) are perspective views of a bushing according to a fourth embodiment of the transmitting chain of the present invention.

Figure 6:
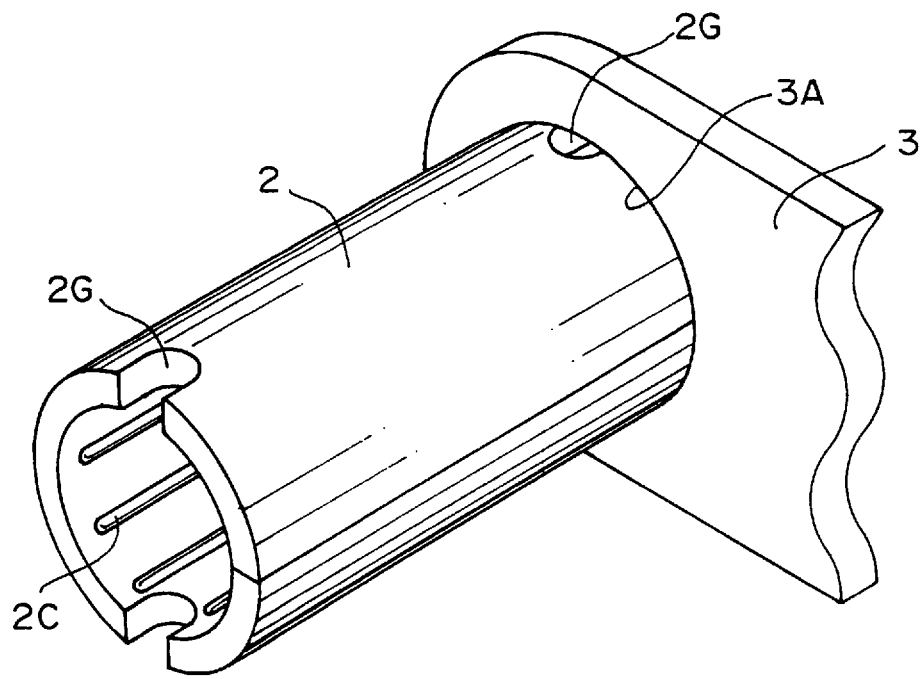

FIG. 6 is a fragmentary perspective view of a bushing and an inner plate according to a fifth embodiment of the transmitting chain of the present invention.

Figure 7:
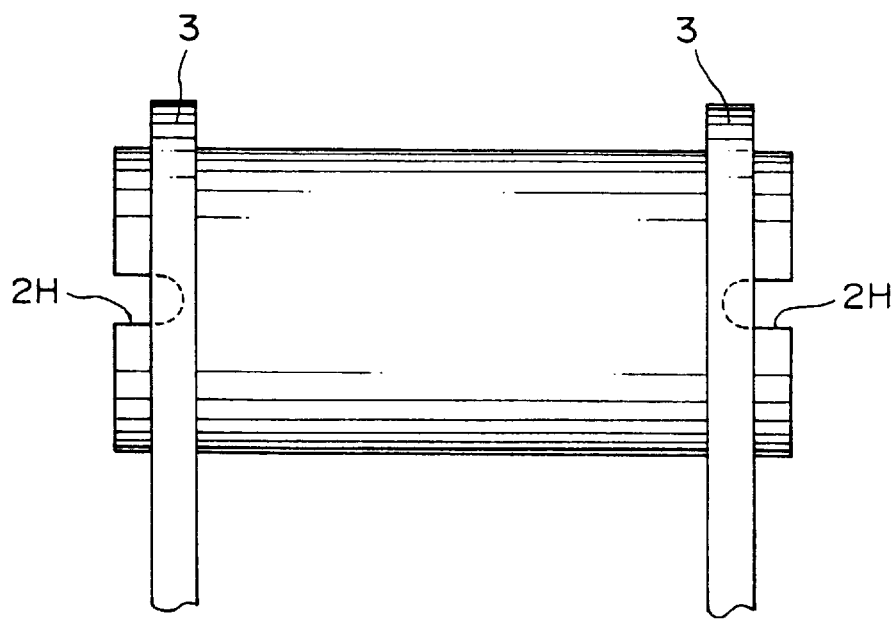

FIG. 7 is a fragmentary plan view of a bushing and an inner plate according to a sixth embodiment of the transmitting chain of the present invention.

Figure 8A:
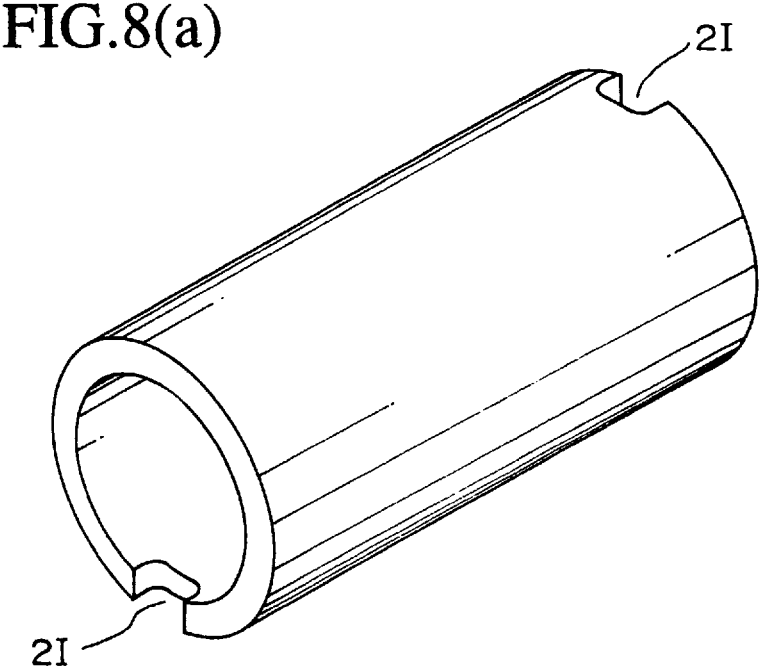
Figure 8B:
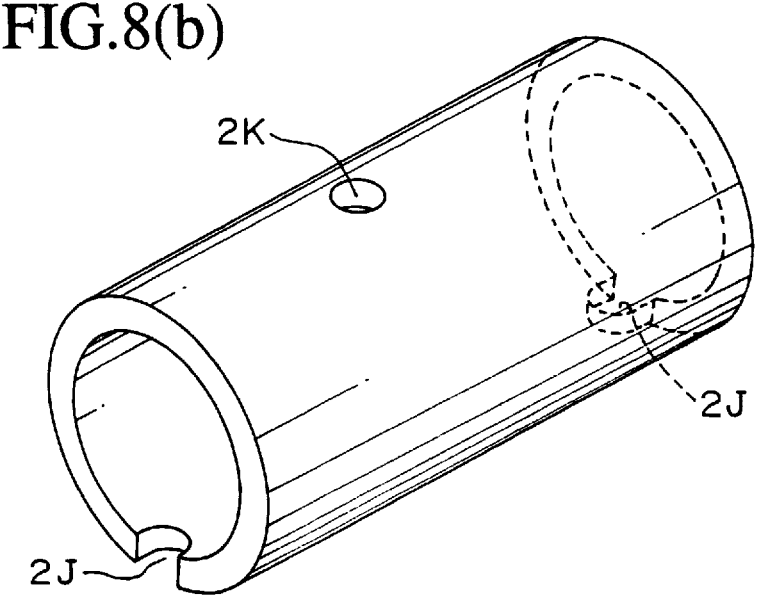

FIGS. 8(a) and 8(b) are perspective views of a bushing according to still a seventh embodiment of the transmitting chain of the present invention.

Figure 9A:
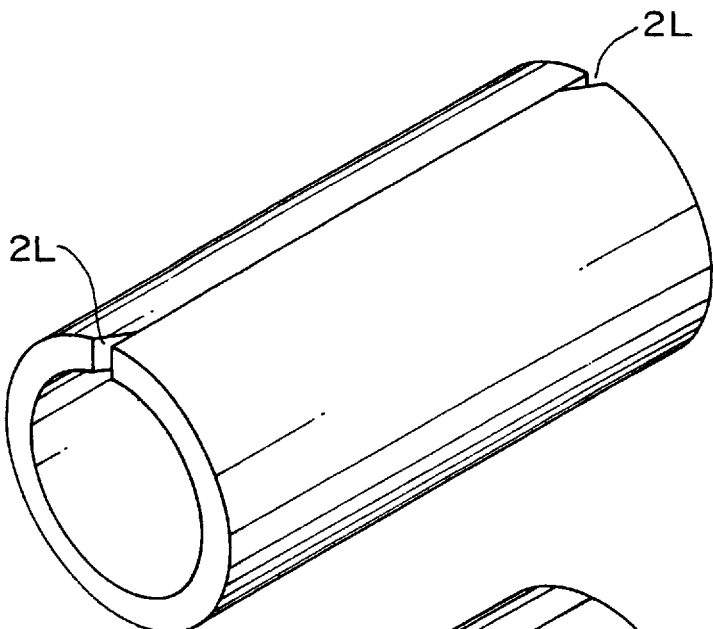
Figure 9B:
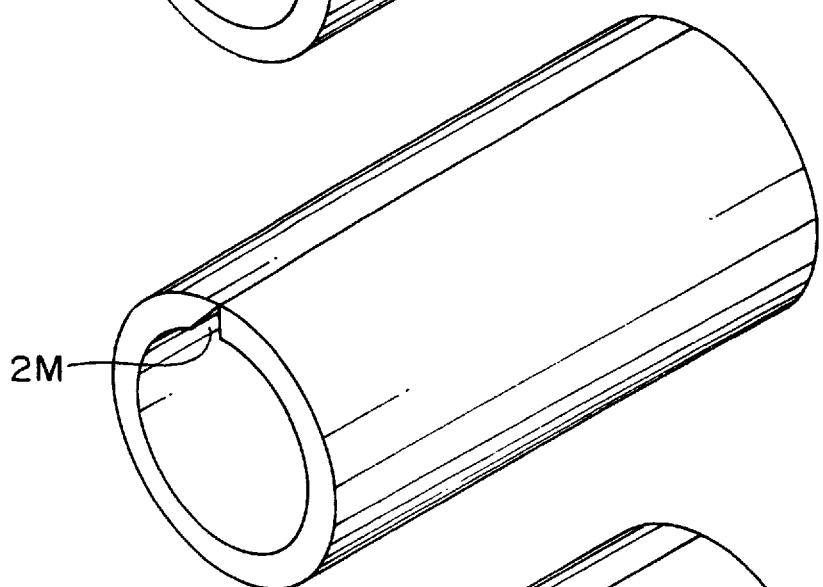
Figure 9C:
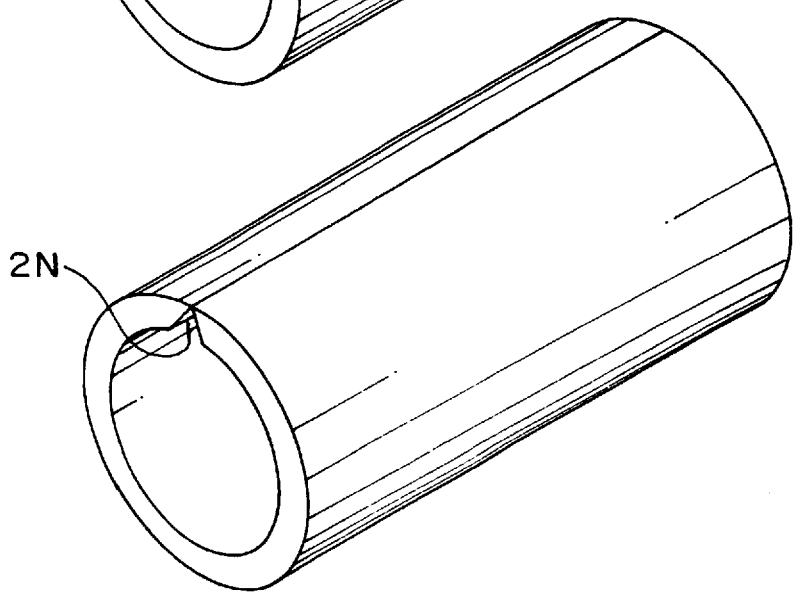

FIGS. 9(a), 9(b), and 9(c) are perspective views of a bushing according to an eighth embodiment of the transmitting chain of the present invention.

FIG. 10 is a graph showing the test results of abrasion elongation of the chain of the transmitting chain of the present invention and the conventional transmitting chain.

Figure 11:
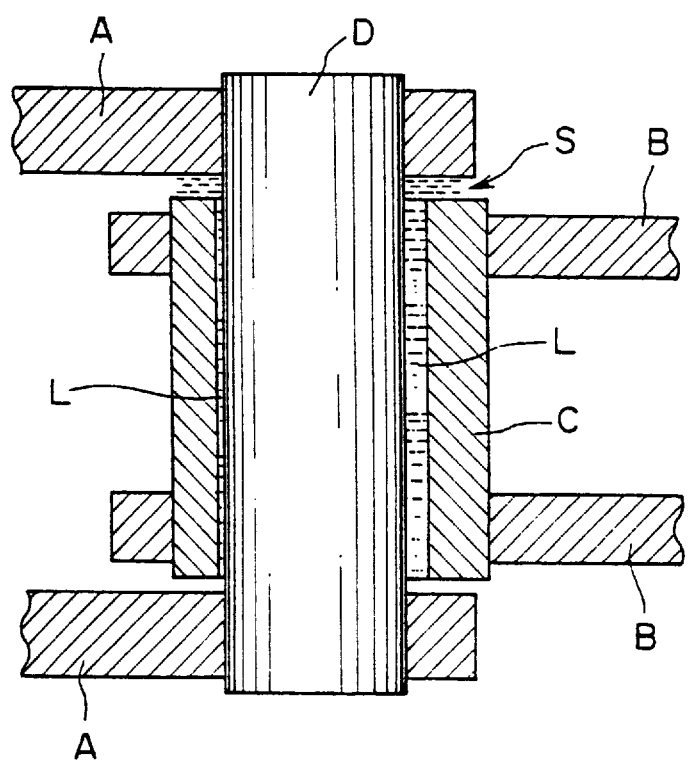

FIG. 11 is a fragmentary cross-sectional view showing the construction of a conventional general transmitting chain.

DETAILED DESCRIPTION OF THE INVENTION

Figure 1:
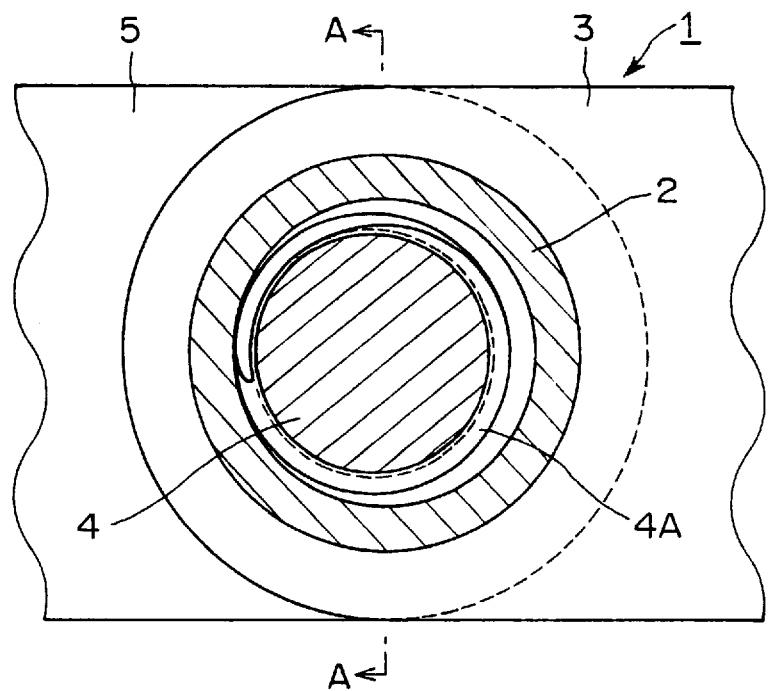
FIG. 1 is a longitudinal cross-sectional view showing a first embodiment of the transmitting chain according to the present invention.
Figure 2:
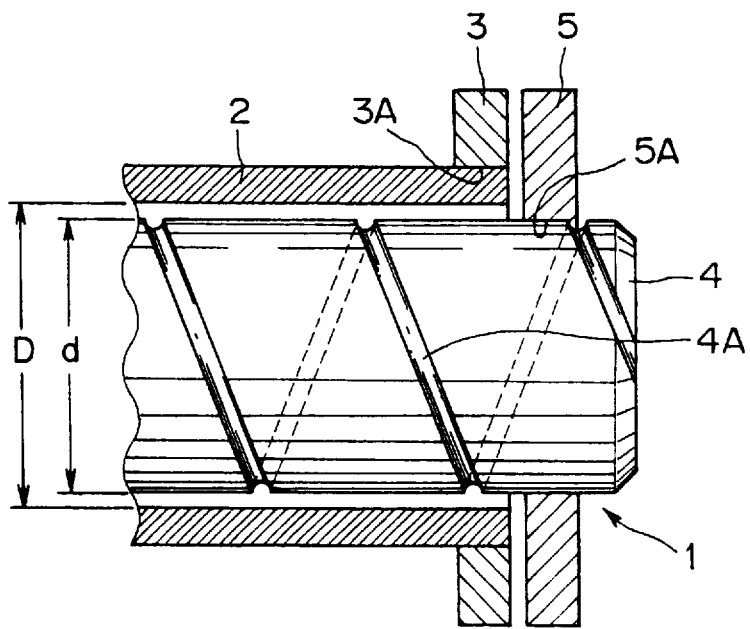
FIG. 2 is a cross-sectional view as viewed in the direction of the arrows at a position taken along line A—A of FIG. 1.

Embodiments of the present invention will be described hereinafter with reference to the drawings. FIG. 1 is a longitudinal cross-sectional view showing a first embodiment of a transmitting chain according to the present invention, and FIG. 2 is a cross-sectional view as viewed in the direction of the arrows at a position taken along line A—A of FIG. 1. A transmitting chain 1 (hereinafter merely referred to as a chain 1) is constructed such that outer peripheries, on both ends of a hollow cylindrical bushing 2, are fitted in and secured to bushing holes 3A of a pair of inner plates 3, and both ends of pins 4, rotatably inserted into the bushing 2, are fitted in and secured to pin holes 5A of outer plates 5 arranged externally of the pair of inner plates 3.

In the first embodiment, the inner peripheral surface of the bushing 2 is smoothly finished, but a spiral groove 4A is formed in the outer peripheral surface of the pin 4 over the full length thereof, and lubricating oil, directly blown on the chain 1 from outside thereof or fed so as to pass through an oil pan, is moved into and stored in the groove 4A.

In the chain of the present invention, a difference (D–d), space, or clearance, located between an inside diameter D of the bushing 2 and an outside diameter d of the pin 4 is set to be very small, i.e., in a range of from about 0.05 to 0.6% of the outside d of the pin.

Therefore, an oil film of lubricating oil, formed between the inside diameter D of the bushing 2 and an outside diameter d of the pin 4, is very thin. Since the difference (D–d), space, or clearance, located between the inside diameter of the bushing 2 and the outside diameter of the pin 4, is small, a surface pressure of contact surfaces therebetween, which is generated when a load is applied to the chain 1, is small. Furthermore, since the lubricating oil moved into the groove 4A is supplied between the contact surface, it is difficult to cut the oil-film so that a good lubricating state is maintained.

FIGS. 3(a) and 3(b) are perspective views of a pin 4 according to a second embodiment of the present invention. More particularly, FIG. 3(a) shows a number of parallel annular grooves 4B formed to store and retain lubricating oil in the outer peripheral surface of the pin 4. FIG. 3(b) shows a number of depressions 4C scattered in the whole outer peripheral surface of the pin 4 to store lubricating oil in the depressions 4C.

Figure 4A:
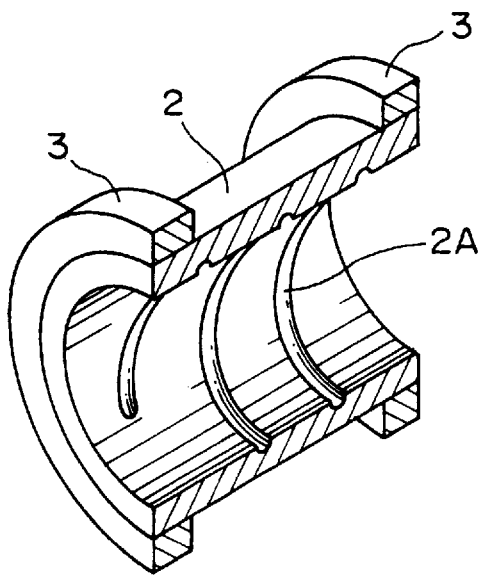
Figure 4B:
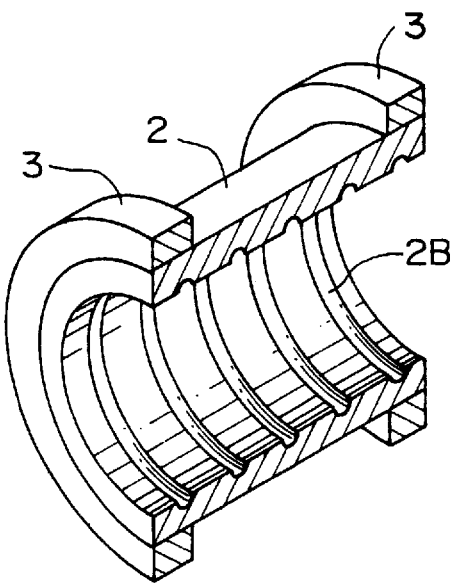
Figure 4C:
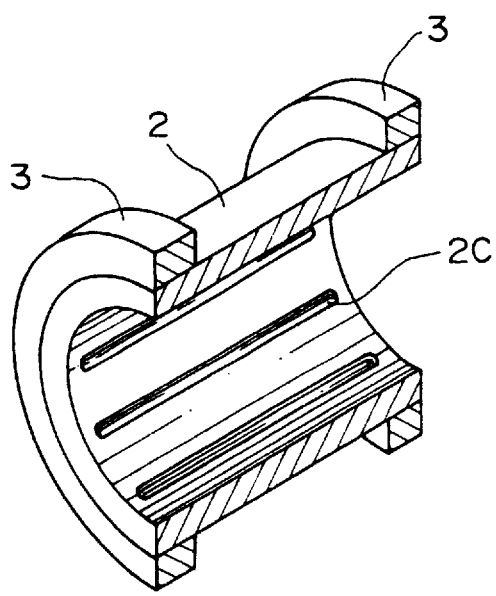
Figure 4D:
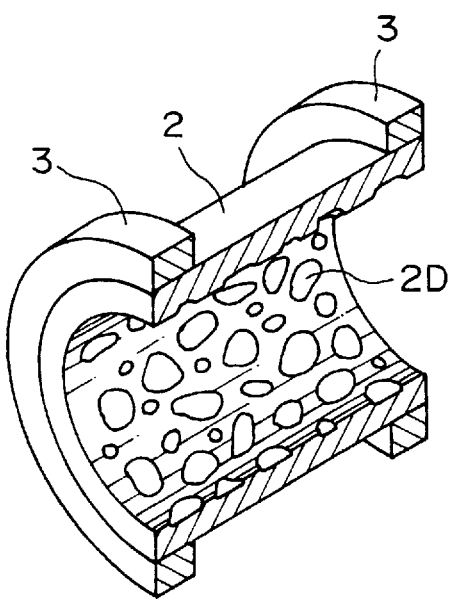

FIGS. 4(a), 4(b), 4(c), and 4(d) are perspective cross-sectional views of a bushing 2 mounted on an inner plate according to a third embodiment of the present invention. More particularly, FIG. 4(a) shows a spiral groove 2A formed in the inner peripheral surface of the bushing 2. FIG. 4(b) shows a number of parallel annular grooves 2B formed in the inner peripheral surface of the bushing 2. FIG. 4(c) shows axially parallel linear grooves 2C formed in the inner peripheral surface of the bushing 2. FIG. 4(d) shows a number of depressions 2D scattered in the whole inner peripheral surface of the bushing 2.

Although not shown, pins 4 having smoothly finished surfaces are combined with the bushing 2 formed with the grooves 2A, 2B, 2C and depression 2D for use.

In the grooves 2A, 2B, 2C and on the depression 2D, surplus lubricating oil is stored. The lubricating oil has been moved into the grooves 2A, 2B, 3C and the depression 2D from the end of the bushing 2 to form an oil film between the inner peripheral surface of the bushing 2 and an outer peripheral surface of the pin (not shown).

FIGS. 5(a) and 5(b) are perspective views of a bushing according to a fourth embodiment of the present invention. More particularly, FIG. 5(a) shows the linear groove 2C, shown in the above-described FIG. 4(c), formed in the inner peripheral surface of the bushing 2, and a circular hole 2E to allow communication between the inner peripheral surface and the outer peripheral surface of the bushing 2.

In the fourth embodiment, the bushing 2 is formed by cylindrically bending a rectangular metal plate blank. Prior to bending, semi-circular notches are punched in advance in two sides of the rectangular metal plate which is a blank for the bushing 2, and the two sides are placed in contact by bending to form a hole 2E.

In the arrangement of the chain shown in FIG. 5(b), semi-circular notches 2F are punched. The positions of the semi-circular notches 2F are deviated in two sides of a flat rectangular metal plate, which is a blank for the bushing 2 and thereafter, the flat rectangular metal plate is bent into a cylindrical shape. The two semi-circular holes 2F are formed to allow communication between the inner peripheral surface and the outer peripheral surface of the bushing 2. Furthermore, a spiral groove 2A, similar to the spiral groove shown in FIG. 4(a), is formed in the inner peripheral surface of the flat rectangular metal plate rolled into a cylindrical shape.

The holes 2E and the notches 2F are formed so that the lubricating oil can also be supplied from the outer peripheral surface of the bushing 2 to the inside thereof and thus, a better lubricating state can be obtained.

FIG. 6 is a perspective fragmentary view showing a state in which the bushing 2 is fitted into the inner plate 3 according to a fifth embodiment of the present invention. In the fifth embodiment, the linear groove 2C, similar to the one shown in FIG. 4(c), is formed in the inner peripheral surface of the bushing 2, and U-shaped notches 2G are formed at first and second ends of the bushing 2 in the longitudinal direction of the bushing 2.

The notches 2G are exposed from the end of the bushing 2 to the inside of the plate 3 beyond the bushing hole 3A formed in the inner plate 3, and the outer peripheral surface of the bushing 2 communicates with the inner peripheral surface of the bushing 2 by means of the notches 2G.

In the fifth embodiment, the lubricating oil supplied between the inner plate 3 and the outer plate (not shown) can easily flow into the bushing 2 by passing through the notches 2G at the end of the bushing 2, and the lubricating oil can also flow into the bushing 2 from a part of the notches 2G exposed inside the inner plate 3.

The notches 2G also fulfill a role to store lubricating oil as do the grooves 2C formed in the inner peripheral surface of the bushing 2.

FIG. 7 shows a sixth embodiment of the present invention in the form of a modification of the fifth embodiment shown in FIG. 6. In the sixth embodiment, U-shaped notches 2H, similar to the notches 2G shown in FIG. 6, are formed in both ends of the bushing 2. However, the notches 2H do not reach the inside of the inner plate 3, so that only the end of the bushing 2 is opened to the outside.

The sixth embodiment of FIG. 7 is different from the fifth embodiment of FIG. 6 merely in that lubricating oil does not flow into the interior from the outer peripheral surface of the bushing 2 between a pair of inner plates 3.

FIGS. 8(a) and 8(b) are perspective views of a bushing according to a seventh embodiment of the present invention. In FIG. 8(a), notches 21 are shown to be formed in opposite positions in a diametrical direction from each other at both first and second ends of the bushing 2. In FIG. 8(b), U-shaped notches 2J are shown to be formed in axially opposite positions of both first and second ends of the bushing 2, similar to those shown in FIGS. 6 and 7. Furthermore, a circular hole 2K is formed in the central portion of the bushing 2 to communicate between the inner peripheral surface and the outer peripheral surface thereof.

FIGS. 9(a), 9(b), and 9(c) are perspective views of a bushing according to an eighth embodiment of the present invention. In FIGS. 9(a), 9(b), and 9(c), a rectangular metal plate blank is bent or rolled into a cylindrical shape to form the bushing 2, similar to the fourth embodiment shown in FIG. 5. More particularly, in FIG. 9(a), corner portions of the metal plate blank are obliquely chamfered prior to bending to thereby form triangular notches 2L in both ends of the bushing 2.

In FIG. 9(b), chamfering is applied, prior to bending, to an inner portion of one of two sides of the metal plate blank placed in contact with each other by bending to form a groove 2M, having an axial V-shaped cross-section, in the inner peripheral surface of the bushing 2.

In FIG. 9(c) both sides of the metal plate blank, placed in contact with each other by bending, are chamfered to form a V-shaped groove 2N.

The inner peripheral surface of the bushings 2, shown in FIGS. 8, 9(a) and 9(b), is smoothly finished.

FIG. 10 is a graph showing the results of comparison tests of abrasive elongations with respect to four kinds of transmitting chains, as follow: a general prior art chain (A), in which a difference, space, or clearance, located between an inside diameter of a bushing and an outside diameter of a pin, is set to approximately 1.5% of the outside diameter of the pin; a chain (B), in which a difference, space, or clearance, located between an inside diameter of a bushing and an outside diameter of a pin, is set to approximately 1.5% of the outside diameter of the pin, similar to the chain (A), with a groove formed in the inner surface of the bushing, and notches formed in both ends thereof; a chain (C), in which a difference, space, or clearance, located between an inside diameter of a bushing and an outside diameter of a pin, is set in a range of from about 0.05 to 0.6% of the outside diameter of the pin, with the inner peripheral surface of the pin being smoothly finished; and the chain (D) of the present invention.

In the comparison test, each of the four chains (A), (B), (C), and (D) was extended between two sprockets of an elongation tester, and was driven at a running speed of 900 m/min under a load of 175 kN to measure the abrasive elongation percentage (%) with respect to the operating time. Lubricating oil for the engine was used and a forced lubrication was carried out.

The chain (B) and the chain (D) used in the comparison test were formed with axial linear grooves in the inner peripheral surface of the bushing and U-shaped notches at both ends of the bushing as shown in FIG. 6.

As a result of a series of studies in connection with the present invention, it has been found that when the surface pressure exceeds a fixed limit, the oil film of the lubricating oil is particularly easily cut. The effect on the ease or difficulty of cutting the oil film is small when the construction is used in which the grooves or notches are formed to facilitate the flowing of lubricating oil into the contact surface between the pin and bushing. However, when the abrasion progresses so that the contact area between the pin and the bushing is enlarged to reduce the surface pressure, the grooves or notches are more effective in cutting the oil film.

In other words, at the outset of operation, the chain (B), which was merely adapted to enhance the lubricating property shown in FIG. 10, had an abrasive elongation similar to that of the conventional general chain (A). However, when the abrasion progressed to some extent and the surface pressure was reduced, the effect of easier melting of the oil film appeared and the abrasive elongation was less than that of the conventional chain (A).

In the chain (C), in which a difference between the inside diameter of the bushing and the outside diameter of the pin is small, since the surface pressure is lower than the conventional chain (A) and the chain (B), the abrasive elongation at the outset of operation is less. However, after the elongation of the chain (B) at the outset of operation occurred, the abrasion of the pin and the bushing progress so that the surface pressure lessens and the lubricating performance is enhanced. Then, the elongation percentage of the chain (B) is reduced as compared with that of the chain (C).

On the other hand, the chain (D), according to the present invention, at the outset of operation, has similar effects to those of the chain (C) so that the elongation is less. Thereafter, the chain (D) has an effect similar to that of the chain (B) and therefore, the effect of chain (C) and chain (B) are geometrically combined in chain (D) so that the elongation percentage is far below the elongation percentage of the conventional general chain (A).

Although not illustrated in the above-described embodiment, grooves or depressions may be formed in both the inner peripheral surface of the bushing and the outer peripheral surface of the pin. Further, in the case where a notch or a hole is formed between the inner peripheral surface of the bushing and the outer peripheral surface of the pin, the inner peripheral surface of the bushing and the outer peripheral surface of the pin can be smoothly finished similar to the general chain.

Further, while in the above-described embodiment, an explanation has been given with respect to the bushing of the chain not provided with a roller, it is also noted that in a transmitting roller chain in which a roller is freely rotatably mounted in the outer periphery of the bushing, the bushing and the pin can be applied to a constitution similar to these embodiments.

Particularly, in the transmitting roller chain, in the case where the inner peripheral surface of the bushing communicates with the outer peripheral surface thereof by means of the hole or the notch, there is a meritorious effect that lubricating oil, having moved into a difference, space or clearance, located between the inner peripheral surface of the roller and the outer peripheral surface of the bushing, is allowed to flow by the rotation of the roller to facilitate an entry thereof into the bushing through the hole or the notch.

As described above, according to the transmitting chain of the present invention, the difference, space, or clearance, located between the inside diameter of the bushing and the outside diameter of the pin, is smaller than that of the conventional transmitting chain so that the difference is about 0.05 to 0.6% of the outside diameter of the pin. Therefore, it is possible to lower the surface pressure of the contact portion therebetween. Further, since the groove or the depression (into which lubricating oil, supplied from outside the chain, is moved) is formed in at least one of the inner peripheral surface of the bushing and the outer peripheral surface of the pin, the lubricating oil stored in the groove or the depression is replenished between the bushing and the pin, so that it is difficult to cut the oil-film. Thus, the abrasion of the bushing and the pin is suppressed, the abrasion elongation of the chain can be reduced, and the durability is improved so that the chain is highly capable of withstanding the high load.

According to the transmitting chain of the present invention, it is possible to lower the surface pressure of the contact portion between the bushing and the pin. Since the notch or the hole is formed to allow flow of lubricating oil between the outer peripheral surface and the inner peripheral surface of the bushing, lubricating oil easily flows from outside into the difference, space, or clearance, located between the bushing and the pin, so that it is difficult to cut the oil-film. Thus, the abrasion of the bushing and the pin is suppressed, the abrasion elongation of the chain can be reduced, and the durability of the chain is improved so that the chain is highly capable of withstanding the high load.

Further, according to the transmitting chain of the present invention, it is possible to lower the surface pressure of the contact portion between the bushing and the pin. Since the groove or the depression, which holds lubricating oil supplied from outside the chain, is formed in at least one of the inner peripheral surface of the bushing and the outer peripheral surface of the pin, and since the notch or the hole is formed to allow flow of lubricating oil between the outer peripheral surface and the inner peripheral surface of the bushing, the lubricating oil easily flows from outside the chain into the difference, space, or clearance, located between the bushing and the pin. Furthermore, since the lubricating oil, which has flown, is stored in the groove or the depression, the lubricating state can be further enhanced to more effectively reduced the abrasion elongation of the chain.

What is claimed is:

1. A transmitting chain comprising:
   a pair of inner plates, wherein each inner plate of said pair of inner plates has a pair of bushing-holes;
   a pair of outer plates, wherein each outer plate of said pair of outer plates has a pair of pin-holes;
   a pair of hollow cylindrical bushings each having first and second ends with outer peripheries which are fitted in and secured to said bushing-holes of said pair of inner plates;
   a pair of pins each rotatably inserted into one of said pair of bushings, wherein each pin of said pair of pins have first and second ends which are fitted in and secured to said pin-holes of said outer plates arranged on both outer sides of said pair of inner plates;
   any one of a groove and a depression into which lubricating oil, supplied from outside of said chain, is held, wherein anyone of said groove and said depression is formed in at least one of a group consisting of an inner peripheral surface of said pair of bushings and an outer peripheral surface of said pair of pins; and
   a space, located between an inside diameter of said pair of bushings and an outside diameter of said pair of pins, of portions of said chain not including any one of said groove and said depression, is set in a range of from 0.05 to 0.6% of said outside diameter of said pair of pins.

2. The transmitting chain as set forth in claim 1, further including any one of a notch and a hole, formed to allow flow of lubricating oil, extending between an outer peripheral surface and an inner peripheral surface of said pair of bushings.

3. The transmitting chain as set forth in claim 1, further comprising:
   a plurality of inner link assemblies having said pair of inner plates and said pair of bushings;
   a plurality of outer link assemblies having said pair of outer plates and said pair of pins, wherein each of said inner link assemblies is connected to said outer link assemblies adjacent to said inner link assembly; and
   an offset link assembly comprising:
      a pair of offset plates;
      a hollow cylindrical bushing having first and second ends with outer peripheries which are fitted in and secured to a first end of each of said pair of offset plates; and
      a pin having first and second ends which are rotatably fitted in and secured to a second end of each of said pair of offset plates, wherein said pin of said offset link assembly is inserted into said bushing of one of said inner link assemblies adjacent to said offset link assembly, wherein said pin of one of said outer link assemblies is inserted into said bushing of said offset link assembly, and wherein any one of said groove and said depression is formed in at least one of a group consisting of an inner peripheral surface of said pair of bushings of each of said inner link assemblies, an inner peripheral surface of said bushings of said offset link assembly, an outer peripheral surface of said pair of pins of each of said outer link assemblies and an outer peripheral surface of said pin of said offset link assembly.

4. The transmitting chain as set forth in claim 3, further including any one of a notch and a hole, formed to allow flow of lubricating oil, extending between an outer peripheral surface and an inner peripheral surface of said bushings of each of said inner link assemblies and said offset link assembly.

5. A transmitting chain comprising:

a pair of inner plates, wherein each inner plate of said pair of inner plates has a pair of bushing-holes;

a pair of outer plates, wherein each outer plate of said pair of outer plates has a pair of pin-holes;

a pair of hollow cylindrical bushings each having first and second ends with outer peripheries which are fitted in and secured to said bushing-holes of said pair of inner plates;

a pair of pins each rotatably inserted into one of said pair of bushings, wherein each pin of said pair of pins have first and second ends which are fitted in and secured to said pin-holes of said outer plates arranged on both outer sides of said pair of inner plates;

any one of a notch and a hole, formed to allow flow of lubricating oil, extending between an outer peripheral surface and an inner peripheral surface of said pair of bushings; and a space, between an inside diameter of said pair of bushings and an outside diameter of said pair of pins, is set in a range of from 0.05 to 0.6% of said outside diameter of said pair of pins.

6. The transmitting chain as set forth in claim 5, further comprising:

a plurality of inner link assemblies having said pair of inner plates and said pair of bushings;

a plurality of outer link assemblies having said pair of outer plates and said pair of pins, wherein each of said inner link assemblies is connected to said outer link assemblies adjacent to said inner link assembly; and an offset link assembly comprising:
  a pair of offset plates;
  a hollow cylindrical bushing having first and second ends with outer peripheries which are fitted in and secured to a first end of each of said pair of offset plates; and
  a pin having first and second ends which are rotatably fitted in and secured to a second end of each of said pair of offset plates, wherein said pin of said offset link assembly is inserted into said bushing of one of said inner link assemblies adjacent to said offset link assembly, wherein said pin of one of said outer link assemblies is inserted into said bushing of said offset link assembly, and wherein any one of said notch and said hole extends between an outer peripheral surface of and an inner peripheral surface of said bushings of each of said inner link assemblies and said offset link assembly.

7. A transmitting chain comprising:

a pair of plates;

a hollow cylindrical bushing having first and second ends with outer peripheries which are secured to a first end of each of said pair of plates;

a pin rotatably inserted into said bushing, wherein said pin has first and second ends which are fitted in and secured to a second end of each of said pair of plates;

any one of a groove and a depression into which lubricating oil, supplied from outside of said chain, is held, wherein anyone of said groove and said depression is formed in at least one of a group consisting of an inner peripheral surface of said bushing and an outer peripheral surface of said pin; and a space, located between an inside diameter of said bushing and an outside diameter of said pin, of portions of said chain not including any one of said groove and said depression, is set in a range of from 0.05 to 0.6% of said outside diameter of said pin.

8. The transmitting chain as set forth in claim 7, further including any one of a notch and a hole, formed to allow flow of lubricating oil, extending between an outer peripheral surface and an inner peripheral surface of said bushing.

9. A transmitting chain comprising:

a pair of plates;

a hollow cylindrical bushing having first and second ends with outer peripheries which are fitted in and secured to a first end of each of said pair of plates;

a pin rotatably inserted into said bushing, wherein said pin has first and second ends which are fitted in and secured to a second end of each of said pair of plates;

any one of a notch and a hole, formed to allow flow of lubricating oil, extending between an outer peripheral surface and an inner peripheral surface of said bushing; and a space, between an inside diameter of said bushing and an outside diameter of said pin, is set in a range of from 0.05 to 0.6% of said outside diameter of said pin.

* * * * *